(12) United States Patent
Aubert et al.

(10) Patent No.: US 9,927,932 B2
(45) Date of Patent: *Mar. 27, 2018

(54) MULTI-POINT CAPACITIVE INFORMATION TRANSFER

(71) Applicant: International Business Machines Corporation, Armonk, NY (US)

(72) Inventors: Denis Aubert, St. Paul de Vence (FR); Joaquin Picon, St. Laurent du Var (FR); Bernard Y. Pucci, Cagnes sur Mer (FR); Vincent Tassy, Cagnes dur Mer (FR)

(73) Assignee: International Business Machines Corporation, Armonk, NY (US)

( * ) Notice: Subject to any disclaimer, the term of this patent is extended or adjusted under 35 U.S.C. 154(b) by 447 days.

This patent is subject to a terminal disclaimer.

(21) Appl. No.: 14/718,675

(22) Filed: May 21, 2015

(65) Prior Publication Data

US 2015/0253905 A1 Sep. 10, 2015

Related U.S. Application Data

(63) Continuation of application No. 13/342,443, filed on Jan. 3, 2012, now Pat. No. 9,111,406.

(30) Foreign Application Priority Data

Nov. 25, 2011 (EP) ..................... 11306567

(51) Int. Cl.
*G06Q 40/00* (2012.01)
*G06F 3/044* (2006.01)
(Continued)

(52) U.S. Cl.
CPC ............ *G06F 3/044* (2013.01); *G06Q 20/40* (2013.01); *G07F 7/0813* (2013.01); *G07F 7/0833* (2013.01); *G07F 7/0853* (2013.01)

(58) Field of Classification Search
CPC combination set(s) only.
See application file for complete search history.

(56) References Cited

U.S. PATENT DOCUMENTS 3,917,925 A * 11/1975 del Rio .................... G06K 7/06
178/17 B
6,591,249 B2 7/2003 Zoka
(Continued)

FOREIGN PATENT DOCUMENTS

KR 20080051918 A 6/2008

OTHER PUBLICATIONS

A Capacitive Touch Interface for Passive RFID Tags Alanson P. Sample, Student Member, IEEE, Daniel J. Yeager, Student Member, IEEE, and Joshua R. Smith, Member, IEEE (https://sensor.cs.washington.edu/pubs/WISP/WISP_Sample2009.pdf).*

(Continued)

*Primary Examiner* — Asha Puttaiah
*Assistant Examiner* — Tony Kanaan
(74) *Attorney, Agent, or Firm* — Daniel Simek; Hoffman Warnick LLC

(57) ABSTRACT

Embodiments of the invention provide devices and systems for the transfer of information using multi-point contact on a capacitive surface. In one embodiment, the invention provides a device comprising: a first surface having a plurality of contact points arranged in a pattern and a second surface having a contact area electrically connected to the plurality of contact points, whereby the plurality of contact points on the first surface is activated by a user contacting the contact area on the second surface.

8 Claims, 3 Drawing Sheets

(51) Int. Cl.
*G07F 7/08* (2006.01)
*G06Q 20/40* (2012.01)

(56) References Cited

U.S. PATENT DOCUMENTS

| | | | |
|---|---|---|---|
| 8,245,923 | B1 | 8/2012 | Merrill et al. |
| 8,302,872 | B2 | 11/2012 | Mullen |
| 8,393,545 | B1 | 3/2013 | Mullen et al. |
| 8,413,892 | B2 | 4/2013 | Mullen et al. |
| 2005/0247787 | A1 | 11/2005 | Von Mueller et al. |
| 2006/0253710 | A1 | 11/2006 | Koo |
| 2007/0013662 | A1 | 1/2007 | Fauth |
| 2007/0131759 | A1 | 6/2007 | Cox et al. |
| 2010/0045627 | A1* | 2/2010 | Kennedy ............... G06F 3/0416 345/173 |
| 2010/0082485 | A1 | 4/2010 | Lin et al. |
| 2010/0100467 | A1 | 4/2010 | McCoy et al. |
| 2010/0264227 | A1* | 10/2010 | Joyce ............... G06K 19/06196 235/493 |
| 2011/0028184 | A1 | 2/2011 | Cooper |
| 2011/0095992 | A1 | 4/2011 | Yeh |
| 2011/0276436 | A1 | 11/2011 | Mullen et al. |
| 2011/0284632 | A1 | 11/2011 | Mullen et al. |
| 2011/0284640 | A1 | 11/2011 | Mullen et al. |
| 2012/0007808 | A1 | 1/2012 | Heatherly et al. |
| 2012/0089506 | A1 | 4/2012 | Markison |
| 2013/0036017 | A1 | 2/2013 | Galloway |
| 2013/0044078 | A1 | 2/2013 | Hallenberg et al. |
| 2013/0085941 | A1 | 4/2013 | Rosenblatt et al. |

OTHER PUBLICATIONS http://www.smartcard.co.uk/tutorials/sct-itsc.pdf First Published in Sep. 1992.*

Sumanjeet, "Emergence of Payment Systems in the Age of Electronic Commerce: The State of Art," 2009, pp. 17-36, Global Journal of International Business Research, vol. 2, No. 2, (http://www.globip.com/pde_pages/globalinternational-vol2-article2.pdf).

Greater Giving, "Auctionpay: Card Reader Overview," No Date, 8 pages, Great Living, Portland OR, www.greatergiving.com.

Office Action for U.S. Appl. No. 13/342,443, dated May 24, 2013, 14 pages.

Final Office Action for U.S. Appl. No. 13/342,443, dated Oct. 4, 2013, 17 pages.

Office Action for U.S. Appl. No. 13/342,443, dated Jul. 18, 2014, 17 pages.

Final Office Action for U.S. Appl. No. 13/342,443, dated Dec. 12, 2014, 15 pages.

Notice of Allowance and Fee(s) Due for U.S. Appl. No. 13/342,443, dated Apr. 13, 2015, 12 pages.

* cited by examiner

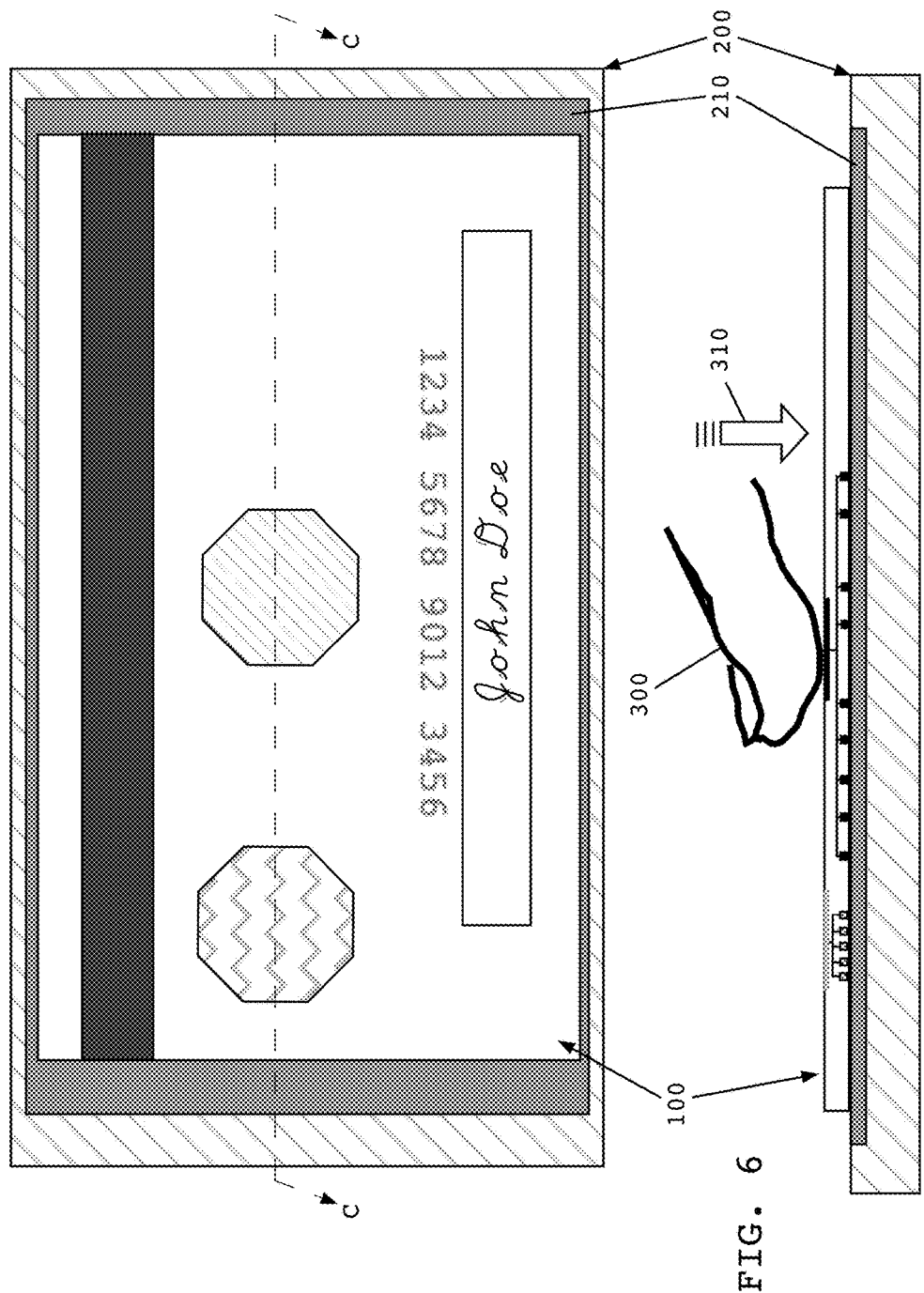

MULTI-POINT CAPACITIVE INFORMATION TRANSFER

BACKGROUND

Embodiments of the invention relate to information transfer and, more particularly, to a device and system for the transfer of information using multi-point contact on a capacitive surface.

Many transactions employ the transfer of information from a first device or object controlled or accessed by a user to a second device or object, which may be controlled by someone other than the user. Simple examples include, for example, the use of a credit card or debit card at a card reader or similar device, whereby the user swipes the card through the card reader to transfer information from the card to the reader. The transferred information (e.g., account number, account or card expiration date, a card security number, a name of an account holder, etc.) may then be used in completing a transaction, such as the purchase of goods or services.

In other cases, information from the card must be entered by the user or someone other than the user. This may arise, for example, in cases where a user is making an on-line purchase. Entry of the necessary information is prone to error and time-consuming. These deficiencies are more pronounced when entering the information using a smart phone, tablet computer, or similar device, given their small size and, more and more frequently, the absence of a physical keypad in favor of a touch screen or similar device.

SUMMARY

One embodiment of the invention provides a device comprising: a first surface having a plurality of contact points arranged in a pattern and a second surface having a contact area electrically connected to the plurality of contact points, whereby the plurality of contact points on the first surface is activated by a user contacting the contact area on the second surface.

Another embodiment of the invention provides a system for transferring information, the system comprising: a device having a first surface having a plurality of contact points arranged in a pattern and a second surface having a contact area electrically connected to the plurality of contact points, and a capacitive screen with which the first surface of the device may be placed in contact, whereby the pattern is transferred to the capacitive screen when the plurality of contact points on the first surface of the device is activated by a user contacting the contact area on the second surface of the device.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIGS. 5 and 6 show top and cross-sectional side views, respectively, of the device of FIGS. 1-4 used with a smart phone having a capacitive screen.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figures 1, 2:
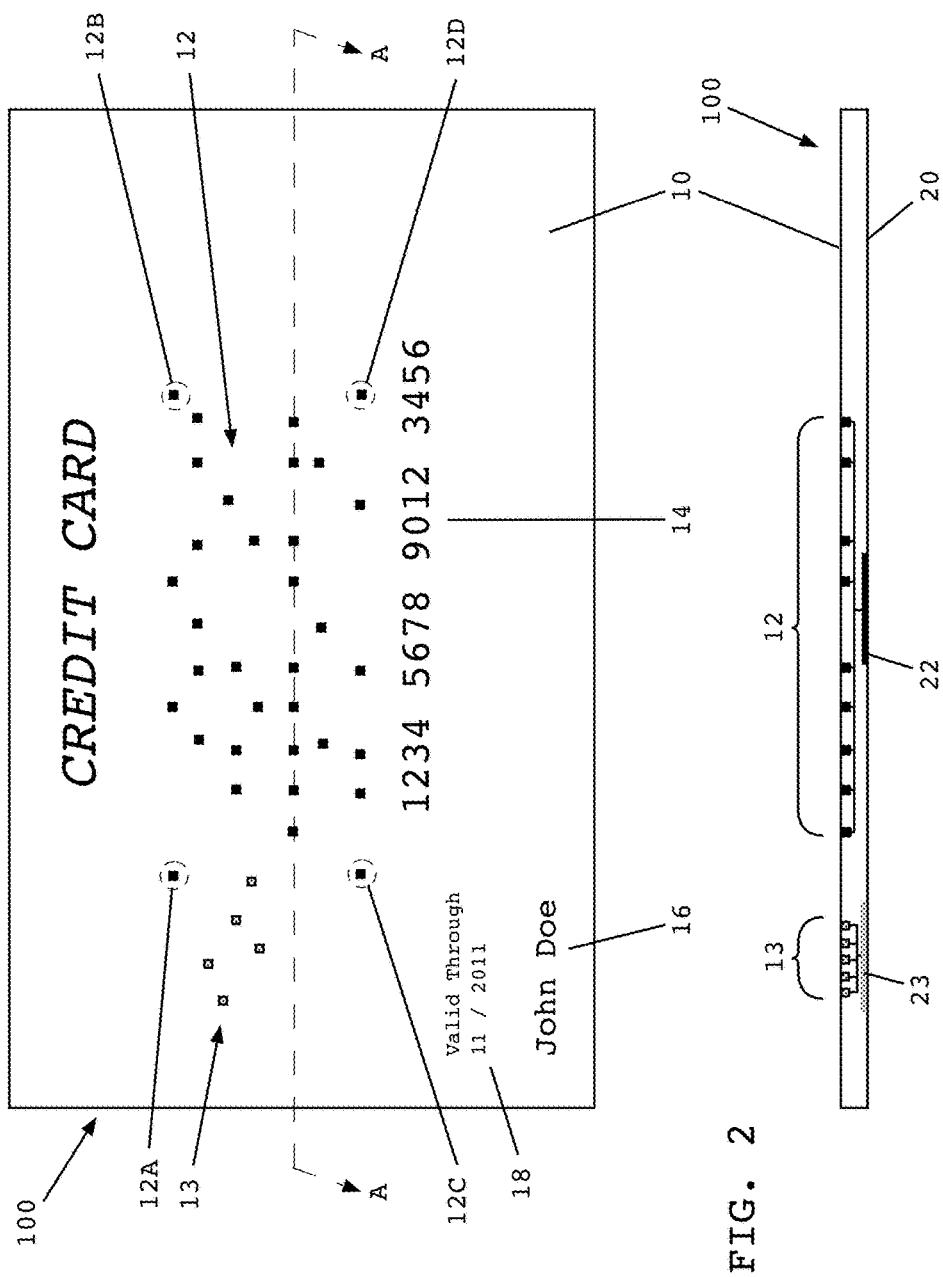
FIGS. 1 and 2 show top and cross-sectional side views, respectively, of a device according to an embodiment of the invention.

Referring now to the drawings, FIG. 1 shows a schematic view of a device 100 according to an embodiment of the invention. Device 100 resembles a typical credit card, debit card, or similar device for storing and transferring information. As such, device 100 includes, on a first surface 10, an account number 14, an account holder name 16, and a device expiration date 18.

In addition, however, device 100 includes a plurality of contact points 12 on first surface 10. The plurality of contact points 12 may be used to transfer information to a capacitive surface capable of recognizing multiple contact points, such as may be found in the screen of a smart phone, tablet computer, or similar device, as will be explained in greater detail below.

As can be seen in FIG. 1, the plurality of contact points 12 is arranged in a pattern, by which information may be transferred from device 100 to a capacitive surface. The plurality of contact points 12 may, in some embodiments of the invention, include one or more positioning contact point 12A, 12B, 12C, 12D, which may aid in orienting the plurality of contact points 12 to ensure accurate pattern recognition. Each of the plurality of contact points 12 may include a metallic material capable of recognition by a capacitive surface, as will be understood by one skilled in the art.

FIG. 2 shows a cross-sectional side view of device 100 taken through plane A of FIG. 1. In FIG. 2, a second surface 20 is shown opposite first surface 10. Second surface 20 includes a contact area 22 electrically connected to each of the plurality of contact points 12. In use, first surface 10 is placed in contact with a capacitive surface (e.g., a smart phone screen, a track pad, a tablet computer screen, etc.) and a user places one or more fingers on contact area 22, thereby activating each of the plurality of contact points 12. A device associated with the capacitive surface (e.g., a smart phone, a table computer, etc.) may then read and interpret the pattern transferred to the capacitive surface by the plurality of contact points 12.

Figures 3, 4:
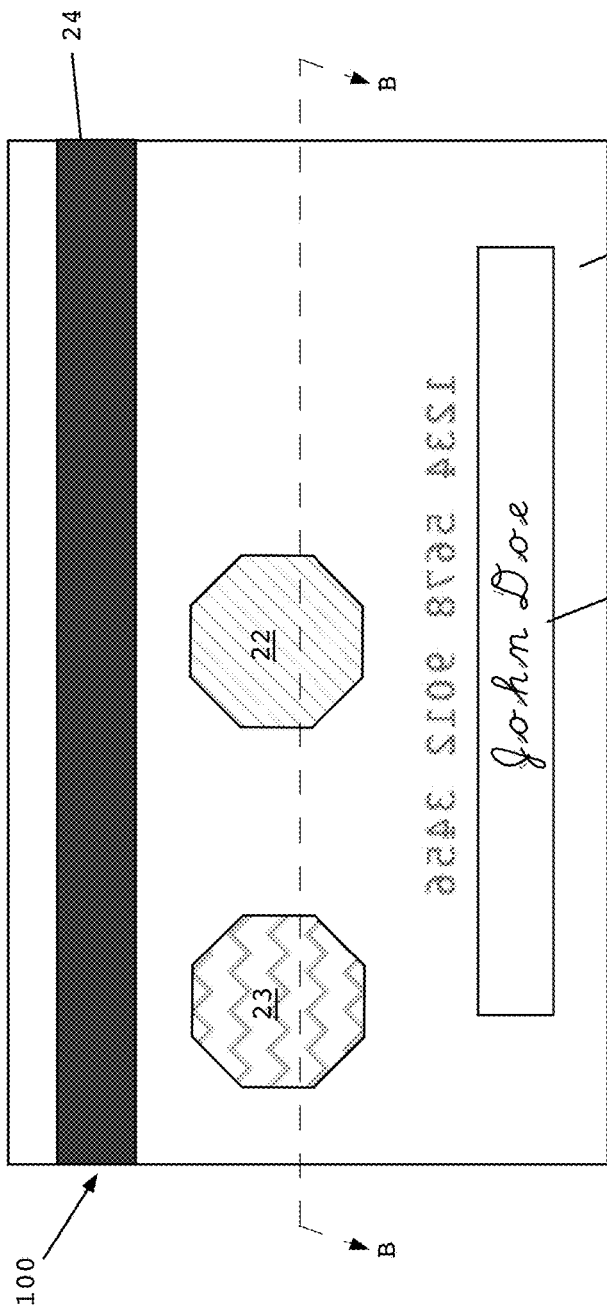
FIGS. 3 and 4 show alternate top and cross-sectional side views, respectively, of the device of FIGS. 1 and 2.

FIG. 3 shows second surface 20 of device 100. Device 100 may include conventional features, such as a magnetic stripe 24 and a signature field 26.

Contact area 22 is shown having an octagonal shape and located in approximately the center of device 100, although this is neither necessary nor essential. Contact area 22 may be of any shape and located anywhere on second surface 20. Similarly, contact area 22 may be of any size sufficient for its use in providing a location for a user to place one or more fingers.

In some embodiments of the invention, device 100 may include more than one contact area—a first contact area 22 and an additional contact area 23—whereby a user may place a finger in contact with each contact area in order to activate each of the plurality of contact points 12 and an additional plurality of contact points 13 (FIGS. 1-2). In other embodiments of the invention, a user may contact a first contact area with a finger to activate the plurality of contact points 12 and a contact an additional contact area 23 with a finger to activate an additional plurality of contact points 13.

FIG. 4 shows a cross-sectional side view of device 100 taken through plane B of FIG. 3, showing features similar to those of FIG. 2.

FIGS. 5 and 6 show top and cross-sectional side views, respectively, of device 100 in contact with a smartphone 200 having a capacitive screen 210. The view of FIG. 6 is taken through plane C of FIG. 5.

In FIG. 6, a user's finger 300 can be seen in contact with contact area 22 (FIG. 4) of device 100, thereby activating the plurality of contact points 12 (FIG. 4) in contact with capacitive screen 210. In some embodiments of the invention, activation of the plurality of contact points 12 may require that the user exert a pressure 310 against contact area 22.

Upon activating the plurality of contact points 12, the pattern in which the plurality of contact points 12 are arranged is transferred to capacitive screen 210, as described above. Smart phone 200 or a similar device may then perform an interpretation of the pattern to reveal information contained within the pattern, such as, for example, an account number, an account expiration date, a device expiration date, a credit card security number, or a name of an account holder. As such, smart phone 200, or another device in communication with smart phone 200, may contain or access a computer program product for translating the pattern.

Other types of information may similarly be transferred as a pre-determined pattern from device 100 to smart phone 200 or a similar device, and then translated, as will be apparent to one skilled in the art.

The interpretation performed by smart phone 200 may be conventional, as may the pattern used to encode the information to be transferred. For example, the pattern may simply employ a pattern of rows and columns, with the position of a contact point within the pattern of rows and columns representing a particular alphabetic or numeric value. This is neither necessary nor essential, however. Information may be encoded in any known or later-developed pattern, with the interpretation of the pattern being made by any corresponding known or later-developed method or technique.

Variations and modifications of the embodiments of the invention described above will be apparent to one skilled in the art and are within the scope of the present invention. For example, although device 100 is described and shown herein as a credit card or debit card, any number of other shapes or forms may similarly be used in practicing the invention. Some embodiments of the device, for example, may take the form of a cube or a disc. Similarly, although the embodiments described above employ a first surface opposite the second surface, other arrangements are possible.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A device comprising:
   a first surface having a plurality of contact points arranged in a pattern; and
   a second surface having a contact area electrically connected to each of the plurality of contact points,
   whereby each of the plurality of contact points on the first surface is simultaneously activated by a user contacting and exerting a pressure against the contact area on the second surface and, when activated, the plurality of contact points is capable of transferring the pattern to a capacitive screen in contact with the first surface;
   wherein: the first surface includes an additional plurality of contact points arranged in an additional pattern; and the second surface includes an additional contact area electrically connected to each of the additional plurality of contact points, whereby each of the additional plurality of contact points on the first surface is simultaneously activated by the user contacting and exerting a pressure against the additional contact area on the second surface and, when activated, the additional plurality of contact points transfers the additional pattern to the capacitive screen.

2. The device of claim 1, wherein the plurality of contact points includes at least one positioning contact point.

3. The device of claim 1, wherein the pattern is a pre-determined pattern representative of an account number.

4. The device of claim 1, wherein the first surface is opposite the second surface and the plurality of contact points is opposite the contact area.

5. A system for transferring information, the system comprising:
   a device having:
   a first surface having a plurality of contact points arranged in a pattern; and
   a second surface having a contact area electrically connected to each of the plurality of contact points; and
   a capacitive screen with which the first surface of the device may be placed in contact,
   whereby the pattern is transferred to the capacitive screen when each of the plurality of contact points on the first surface of the device is simultaneously activated by a user contacting and exerting a pressure against the contact area on the second surface of the device;
   wherein: the first surface of the device includes an additional plurality of contact points arranged in an additional pattern; and the second surface of the device includes an additional contact area electrically connected to each of the additional plurality of contact points, whereby each of the additional plurality of contact points on the first surface is simultaneously activated by the user contacting and exerting a pressure against the additional contact area on the second surface and, when activated, the additional plurality of contact points is capable of transferring the additional pattern to the capacitive screen in contact with the first surface.

6. The system of claim 5, wherein the pattern is a pre-determined pattern representative of an account number.

7. The system of claim 6, further comprising: a computer program product capable of translating the pre-determined pattern into the account number.

8. The system of claim 5, wherein the pattern is a pre-determined pattern representative of at least one of the following: an account number, an account expiration date, a device expiration date, a credit card security number, or a name of an account holder.

* * * * *